(12) United States Patent
Padala et al.

(10) Patent No.: US 8,937,666 B1
(45) Date of Patent: Jan. 20, 2015

(54) USER INTERFACE FOR PROVIDING FEEDBACK FOR HANDHELD IMAGE CAPTURE

(71) Applicant: Google Inc., Mountain View, CA (US)

(72) Inventors: Sameer Padala, San Jose, CA (US); Andrews-Junior Kimbembe, San Francisco, CA (US)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 13/647,722

(22) Filed: Oct. 9, 2012

(51) Int. Cl.
*H04N 5/228* (2006.01)
*H04N 5/225* (2006.01)

(52) U.S. Cl.
USPC .............. 348/208.16; 348/208.14; 348/220.1

(58) Field of Classification Search
None
See application file for complete search history.

(56) References Cited

U.S. PATENT DOCUMENTS

| | | | |
|---|---|---|---|
| 5,734,933 A | 3/1998 | Sekine et al. | |
| 5,881,321 A | 3/1999 | Kivolowitz | |
| 6,771,308 B1 | 8/2004 | Yamamoto et al. | |
| 7,301,527 B2 | 11/2007 | Marvit | |
| 8,126,211 B2 | 2/2012 | Lee et al. | |
| 8,165,345 B2 | 4/2012 | Chau | |
| 8,184,166 B2 | 5/2012 | Wang et al. | |
| 2008/0219654 A1* | 9/2008 | Border et al. | 396/89 |
| 2008/0266406 A1* | 10/2008 | McLeod et al. | 348/208.16 |
| 2010/0188538 A1* | 7/2010 | Sugawa et al. | 348/294 |
| 2011/0001824 A1* | 1/2011 | Chang | 348/143 |
| 2012/0081556 A1* | 4/2012 | Hwang et al. | 348/207.1 |
| 2012/0169937 A1* | 7/2012 | Saito | 348/700 |
| 2013/0070174 A1* | 3/2013 | Yoshida et al. | 349/41 |
| 2013/0114849 A1* | 5/2013 | Pengelly et al. | 382/103 |

* cited by examiner

*Primary Examiner* — Aung S Moe
*Assistant Examiner* — Euel Cowan
(74) *Attorney, Agent, or Firm* — Troutman Sanders LLP; James E. Schutz; Christopher W. Glass

(57) ABSTRACT

A method may include capturing, by a computing device and during a time interval, a plurality of images. The computing device may determine a sharpness of a first image from the plurality of images based on detection of a difference between sharpness of a first plurality of high-contrast areas within the first image and sharpness of a corresponding, second plurality of high-contrast areas within a second image from the plurality of images. The first image may be sent to a search service. Image recognition data based on the first image or indication of unavailability of the image recognition data may be received from the search service. The determining may further include detecting a movement from at least a portion of the first plurality of high-contrast areas within the first image to a corresponding portion of the second plurality of high-contrast areas within the second image.

17 Claims, 7 Drawing Sheets

USER INTERFACE FOR PROVIDING FEEDBACK FOR HANDHELD IMAGE CAPTURE

BACKGROUND

Many computing devices (e.g., handheld computing devices) have built-in cameras for taking individual photos or recording a video stream. To improve image quality and facilitate subsequent image analysis, a user must hold the computing device still to reduce motion blur and keep the camera pointed at the image subject. However, it is often difficult for a user holding a camera steady, to detect camera motion, especially when the user is using a camera within a handheld computing device.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is provided for user interfaces for providing feedback for handheld image capture, substantially as shown in and/or described in connection with at least one of the figures, as set forth more completely in the claims.

These and other advantages, aspects and features of the present disclosure, as well as details of illustrated implementation(s) thereof, will be more fully understood from the following description and drawings.

In accordance with an example embodiment of the disclosure, a method may include capturing, by a computing device and during a time interval, a plurality of images. The computing device may determine a sharpness of a first image from the plurality of images based on detection of a difference between sharpness of a first plurality of high-contrast areas within the first image and sharpness of a corresponding, second plurality of high-contrast areas within a second image from the plurality of images. The first image may be sent to a search service. Image recognition data based on the first image or indication of unavailability of the Image recognition data may be received from the search service.

DETAILED DESCRIPTION

Figure 1A:
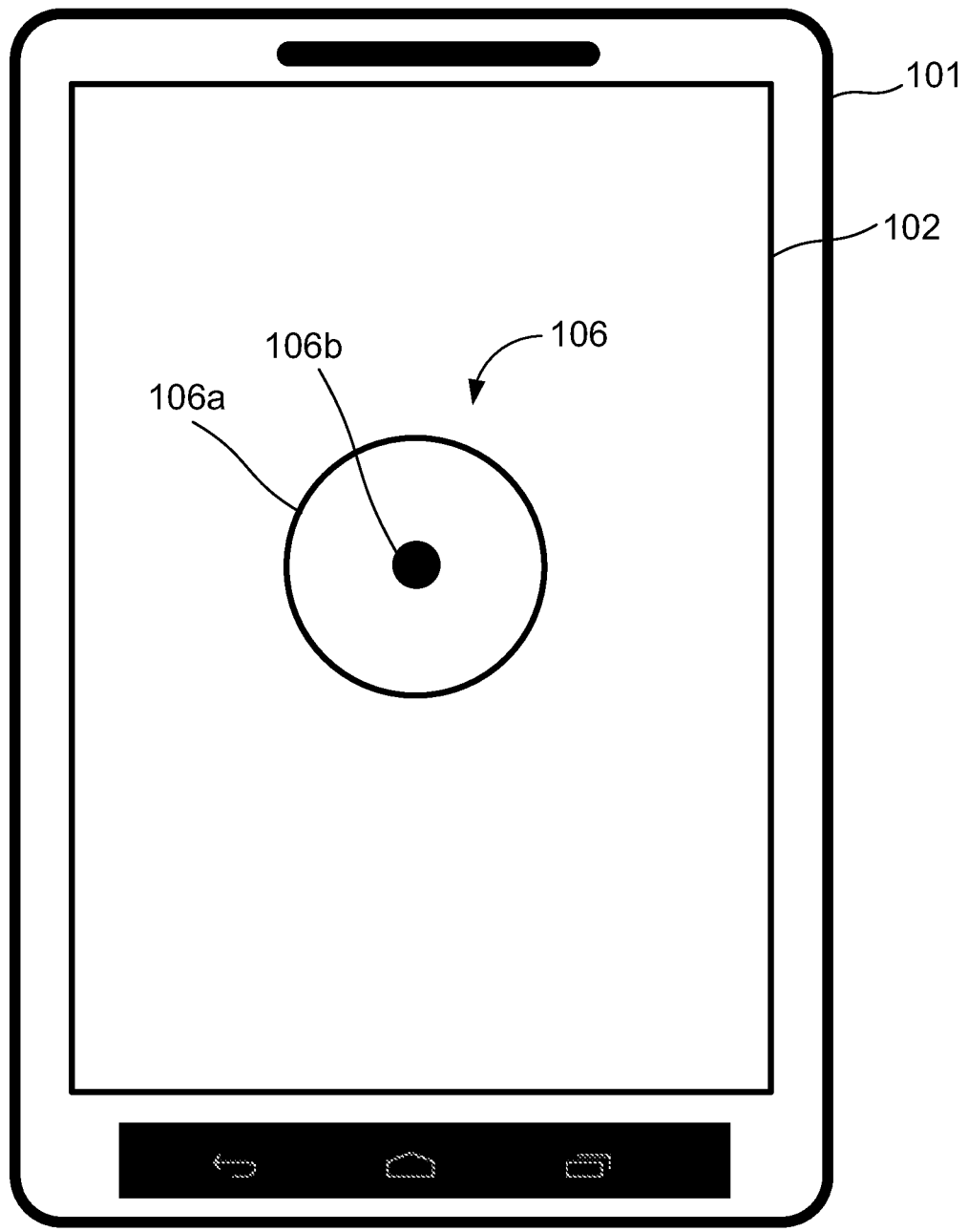
FIGS. 1A-1C are block diagrams illustrating an example computing device with a user interface for providing quality feedback for an image capture, in accordance with an example embodiment of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations.

The present disclosure relates to a method and system for outputting a user interface that provides feedback during handheld image capture. To encourage a user to keep a camera steady (e.g., a camera on a handheld device or another computing device) within a given time interval (herein referred to as a viewing interval), a user interface is displayed on a screen of the handheld device. The user interface may provide feedback about the quality of the images captured by the camera (e.g., change in brightness or sharpness in the image, or detection of an image blur), as well as the remaining time within the viewing interval. If, during the viewing interval, the viewed image becomes unstable because the user moves the device or the image changes (e.g., the image brightness changes), the viewing interval may reset (e.g., there may be an indication, such as a progress bar, for the viewing interval, and the timeout of the indication may be reset).

To determine image stability, the handheld device may use image change detection and/or image movement detection methods (either separately or simultaneously). For example, during image change detection, the handheld device may compare a most-recently captured image from the camera (e.g., brightness and/or sharpness of the current image) with an older image taken within the viewing interval. If the two images differ beyond a predetermined threshold amount, the image may be considered to have changed and the viewing interval timeout (may be reset.

During image movement detection, optical flow may be used to track motion in the image based on the movement of visible features, such as high-contrast areas within the image. More specifically, a plurality of high-contrast areas within the image may be selected and may be tracked to determine the existence of movement of the camera, which may cause image blur. If the selected high-contrast areas (e.g., 7-pixel radius circles) move at a given threshold velocity, it may be concluded that the viewed image is unstable and there is a detected movement. If it is determined that there is camera movement, the viewing interval timeout may be reset. Additionally, as movement of the high-contrast areas is detected, an indication may be displayed showing the direction of movement or simply indicating camera movement is present (and the viewed image is unstable). If image movement is detected, the viewing interval timeout may also be reset.

In instances when the user keeps the handheld device camera steady for the duration of the viewing interval, a sequence of images may be captured using the device camera. The captured images may be analyzed locally, by the handheld device, using, for example, computer vision algorithms (or other type of text or image detection algorithms), to detect features such as barcodes, logos, artwork or other familiar objects within the captured images. Additionally, the handheld device may also send one or more of the captured images to a remote server (e.g., a search service), which may perform additional image analysis to detect text, search one or more databases of known images, detect geographic landmarks, and/or perform other image analysis. In instances when the handheld device or the search service does not recognize any text, logos, barcodes or artwork (or any of the above mentioned example image analyses fail) within the viewing interval, the handheld device may display a failure message to the user upon expiration of the viewing interval.

In this regard, a method for determining image stability of a target being viewed by a camera within a viewing interval may include capturing, by a computing device and during a time interval, a plurality of images. The computing device may determine a sharpness of a first image from the plurality of images based on detection of a difference between sharpness of a first plurality of high-contrast areas within the first image and sharpness of a corresponding, second plurality of high-contrast areas within a second image from the plurality of images. The first image may be sent to a search service. Image recognition data based on the first image or indication of unavailability of the Image recognition data may be received from the search service. A movement may be detected, from at least a portion of the first plurality of high-contrast areas within the first image to a corresponding portion of the second plurality of high-contrast areas within the second image.

Figure 1B:
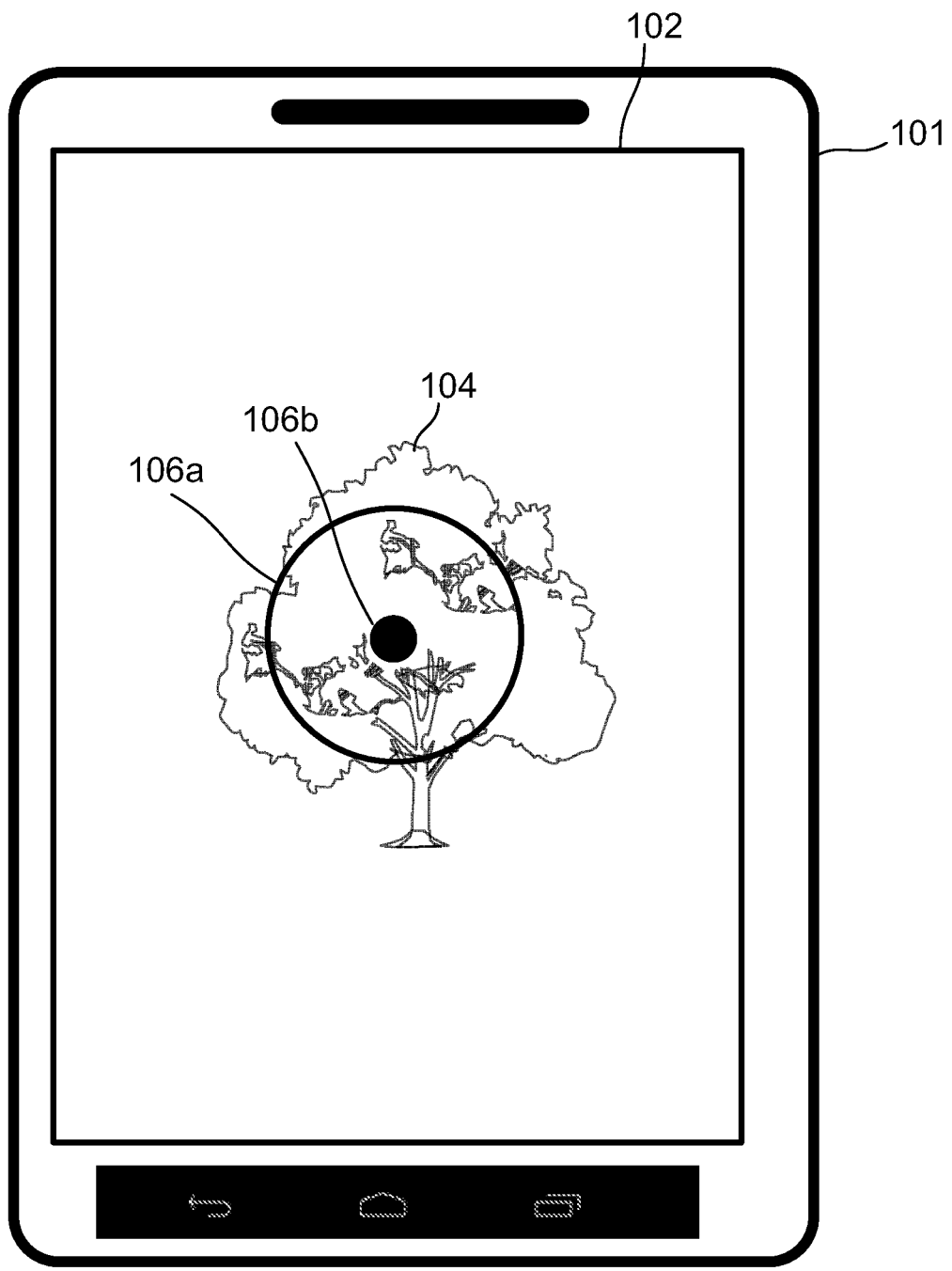
Figure 1C:
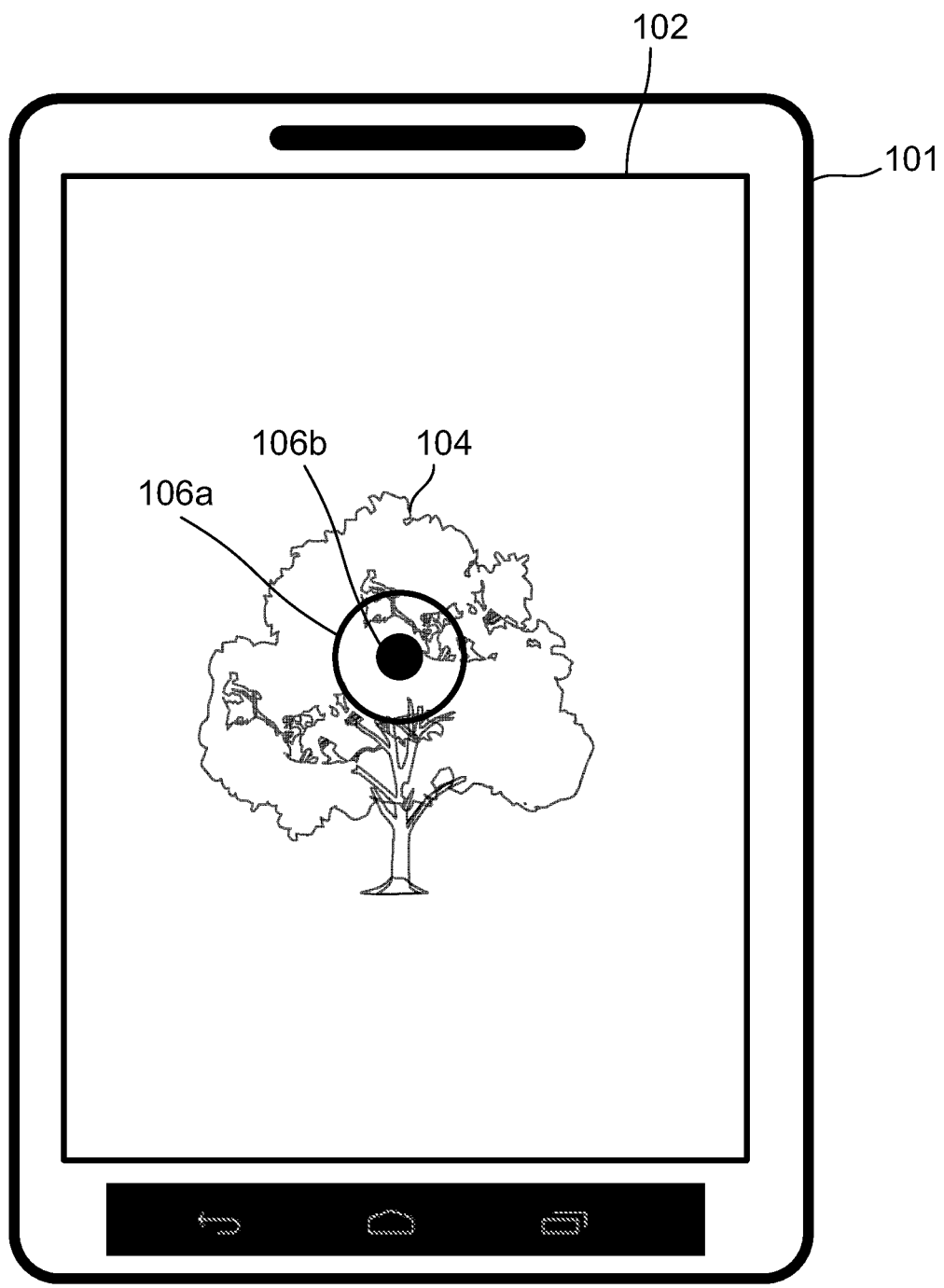

FIGS. 1A-1C are block diagrams illustrating an example computing device with a user interface for providing image quality feedback, in accordance with an example embodiment of the disclosure. Referring to FIGS. 1A-1C, there is illustrated an computing device such as a handheld device (e.g., a smart phone) 101. The handheld device 101 may include a display screen 102. Additionally, the handheld device 101 may include a camera (not illustrated), where the image being captured may be viewed on the screen 102.

In order to encourage the user to keep the handheld device 101 stable during an image capture, a user interface 106 may be displayed on the screen 102. More specifically, the user interface 106 may comprise a pair of concentric circles 106a and 106b. When an image (e.g., image 104 of a tree) is view on the handheld device 101 camera, the pair of circles 106a-106b may be displayed on top of the live camera preview of image 104 to provide feedback about the quality of the images captured by the camera. The initial state of the user interface 106 (e.g., at a time when the handheld device 101 camera is turned ON but before an image is acquired) is illustrated in FIG. 1A. After the handheld device 101 camera is turned ON, an image 104 may be acquired and the user interface 106 may be displayed on top of the acquired image (as illustrated in FIG. 1B).

If the user keeps the handheld device 101 still, the outer circle 106a of the user interface 106 may shrink down during a viewing interval (e.g., several seconds) to match the size of the inner circle 106b. FIG. 1C illustrates the user interface 106 after the user has kept the handheld device 101 camera steady for a portion of the viewing interval. As seen in FIG. 1C, the outside circle 106a of user interface 106 has shrunk down compared to its initial size seen in FIGS. 1A-1B. If the image becomes unstable because the user moves the device or the image changes, the timeout resets. When the timeout resets, the outer circle 106a may be reset to its initial size, as shown in FIGS. 1A-1B. Once the image becomes stable again, the circle 106a begins shrinking as the viewing interval timeout activates again. In instances when the viewing interval timeout reset is caused by motion, the handheld device 101 may use the user interface 106 to indicate a motion direction (as explained below in reference to FIG. 2B).

Figure 2A:
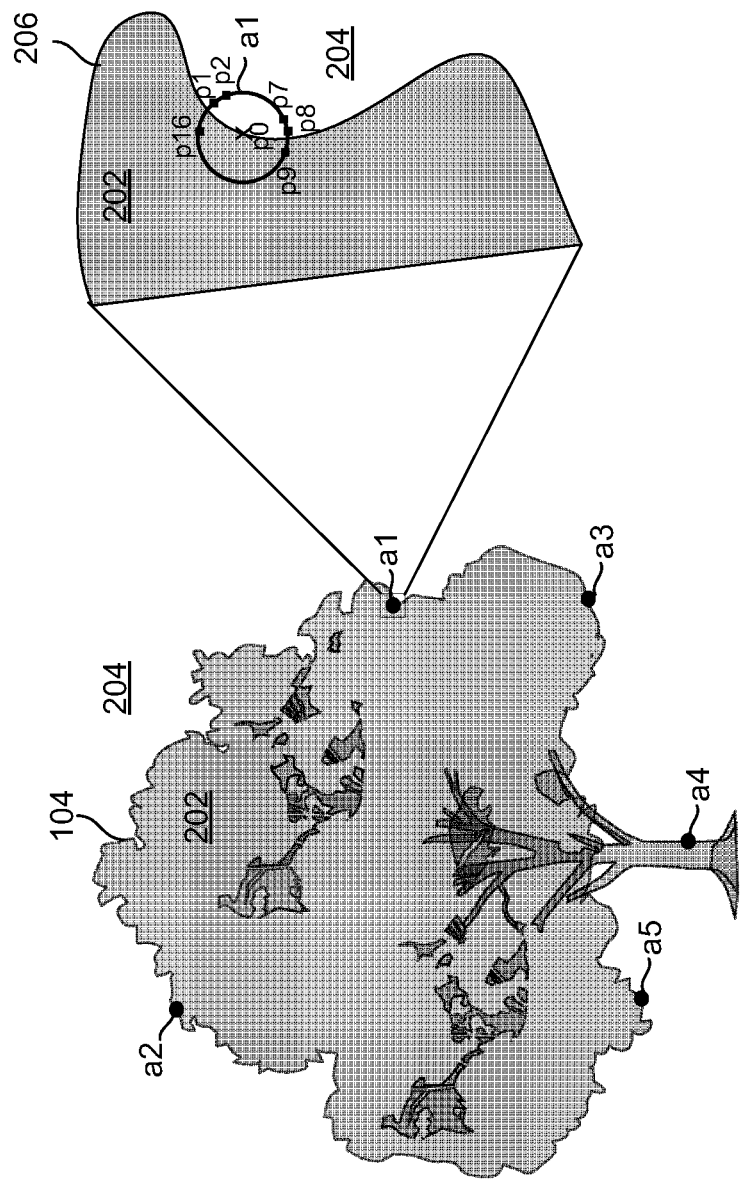
FIG. 2A is a block diagram illustrating selection of high-contrast areas in an image, in accordance with an example embodiment of the disclosure.

In accordance with an example embodiment of the disclosure, to determine image stability, the handheld device 101 may use image movement detection by tracking visible features (e.g., a plurality of high-contrast areas within the image). FIG. 2A is a block diagram illustrating selection of high-contrast areas in an image, in accordance with an example embodiment of the disclosure. Referring to FIG. 2A, there is illustrated an image 202 viewed against a background 204. The handheld device 101 may select a plurality of high contrast areas, such as circles a1-a5. Each of the high-contrast areas a1-a5 may be selected as 7-pixel radius circles. For example, pixel p0 may be selected as a pixel that is close by (or on) the border between image 202 and background 204. Additional pixels (e.g., p1-p16) may be selected along the circumference of circle a1. Pixels p1-p8 may be disposed within the background 204 and along the circumference of circle a1 (pixels p3-p6 are not illustrated in FIG. 2A). Pixels p9-p16 may be disposed within the image 202 and along the circumference of circle a1 (pixels p10-p15 are not illustrated in FIG. 2A). In this regard, the area a1 may be a circle centered at or near pixel p0. Areas a2-a5 may be selected in similar way. Additionally, since areas a1-a5 include both darker color pixels (e.g., p9-p16) from the image 202, as well as lighter color pixels (e.g., p1-p8) from the background 204, areas a1-a5 may be characterized as high-contrast areas. The high-contrast areas a1-a5 may be used to detect image motion, as described in greater detail below in reference to FIG. 2B.

Even though areas a1-a5 are selected as 7-pixel radius circles, the present disclosure may not be limited in this regard. More specifically, the high-contrast areas a1-a5 may be selected as circles of a different radius or as other regular (or irregular) shapes with both image as well as background pixels present along the shape circumference.

Figure 2B:
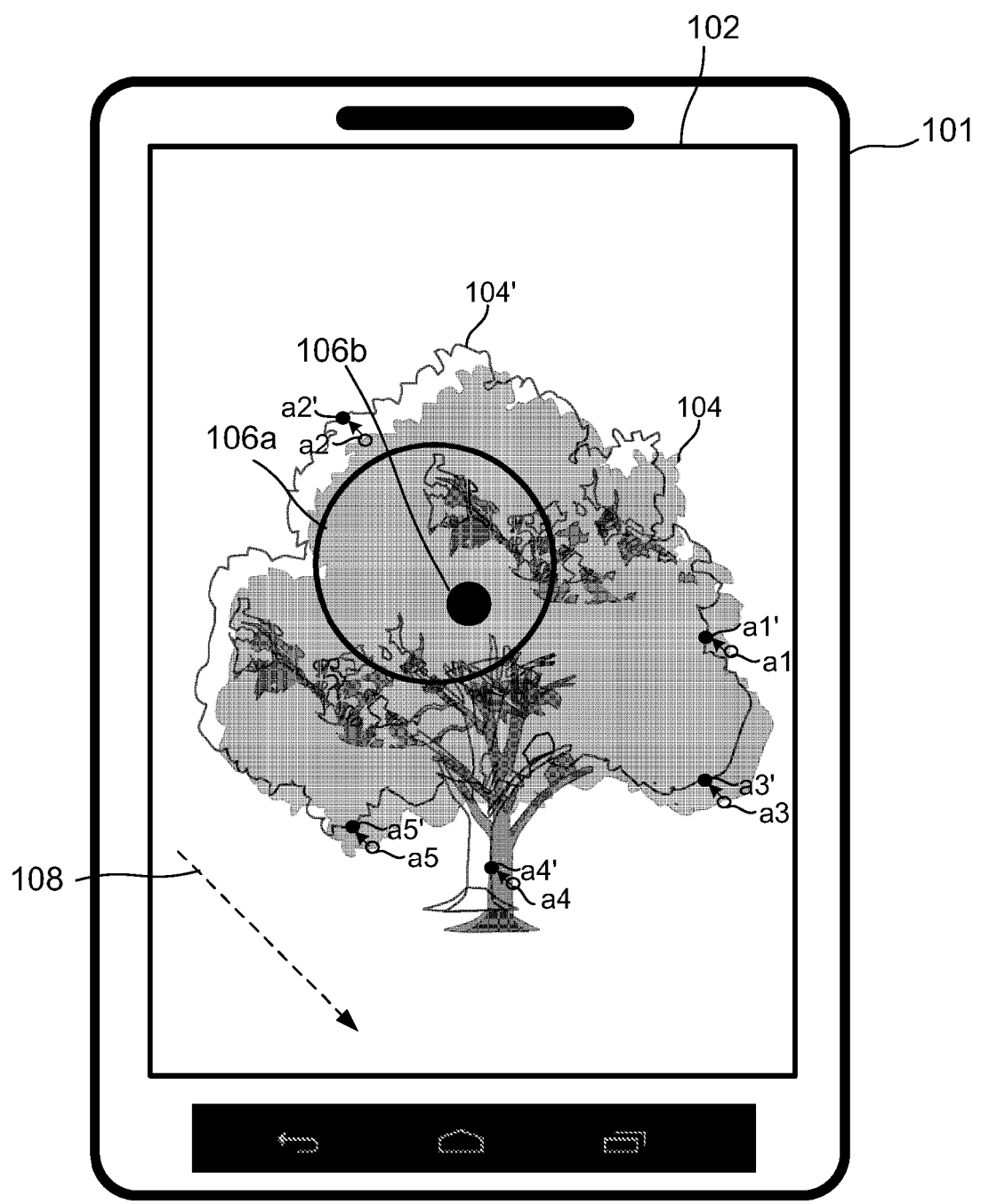
FIG. 2B is a block diagram of the computing device of FIG. 1A with the user interface illustrating motion detection of high-contrast areas, in accordance with an example embodiment of the disclosure.

FIG. 2B is a block diagram of the computing device of FIG. 1A with the user interface illustrating image motion detection of high-contrast areas, in accordance with an example embodiment of the disclosure. Referring to FIG. 2B, a user may be holding device 101 while observing image 104 (seen on display 102) within a viewing interval. As explained in reference to FIG. 2A, a plurality of high-contrast areas a1-a5 may be selected and tracked within the image 104.

While the user is holding handheld device 101, the user may move the device in the direction 108. The movement of handheld device 101 in the direction 108 may result in the shifting of image 104 to image 104'. Additionally, since the handheld device 101 is tracking high-contrast areas a1-a5, the handheld device 101 may determine that the selected high-contrast areas a1-a5 move at a given threshold velocity. For example, the handheld device 101 may detect movement of the high-contrast areas a1-a5 to respective high-contrast areas a1'-a5' within the image 104'. If movement of the high-contrast areas a1-a5 at the threshold velocity is detected, it may be concluded that the viewed image 104 is unstable and there is a detected movement from image 104 to image 104'.

After movement is detected using the high-contrast areas a1-a5, the viewing interval timeout may be reset. Additionally, as movement of the high-contrast areas a1-a5 is detected, an indication may be displayed showing the direction of movement or simply an indication that camera movement is present (and the viewed image 104 is unstable). In instances when the viewing interval timeout reset is caused by motion, the outer circle 106a may expand back to its original size and may slide in a direction that is opposite to the moving direction (e.g., direction 108). By sliding the big circle 106a of the user interface 106 in a direction opposite the moving direction 108, inertia may be simulated as well as the appearance that the outer circle 106a is connected to the inner circle 106b with a spring so that it lags behind the inner circle 106b as the user moves the handheld device 101 in the direction 108. Other visual or textual indications of detected movement may also be provided by the handheld device 101 and shown to the user on the display 102.

Even though image motion detection uses image processing to detect if the scene captured by a camera is moving, the present disclosure may not be limited in this regard. In accordance with an example embodiment of the disclosure, image motion detection may be based on hardware gyroscope and accelerometer sensors built into the camera-enabled handheld device 101, which may be used to determine whether the handheld device 101 is moving.

In accordance with an example embodiment of the disclosure, to determine image stability, the handheld device 101 may also use image change detection techniques (e.g., an image similarity calculation). For example, during image change detection, the handheld device 101 may compare the current image (e.g., 104) from the camera with an older image taken within the viewing interval. If the two images differ beyond an allowable amount, the image 104 may be considered to have changed and the viewing interval timeout may be reset.

For example, image similarity calculations by the handheld device 101 may compare pixel brightness values and may use a grayscale image version of a preview image received from the handheld device 101 camera (i.e., color information may be discarded). Each grayscale pixel may be with a brightness value between 0 and 255, depending on whether it is pure black, pure white, or in-between. In an example implementation of the disclosure, the handheld device 101 may use 16 pixel "buckets", so that each pixel is placed into one of the 16 buckets based on the pixel value (e.g., all pixels with a value between 0 and 15 may be placed into bucket #1, pixels with values between 16 and 31 may be placed into bucket #2, etc.). The handheld device 101 may then generate a signature for each image, which signature may include a list of 16 numbers, each number being the count of pixels in a bucket. Two images may be considered to be different if the signature for one image is different from the signature for another image. The signatures may be compared by treating each signature as a 16-dimensional vector, and then computing the distance between the two vectors. If the distance is greater than a threshold amount, it may be determined that the two images are different, and the viewing interval timeout may be reset. In other instances, sharpness may also be used in place of brightness for image change detection.

Figure 3:
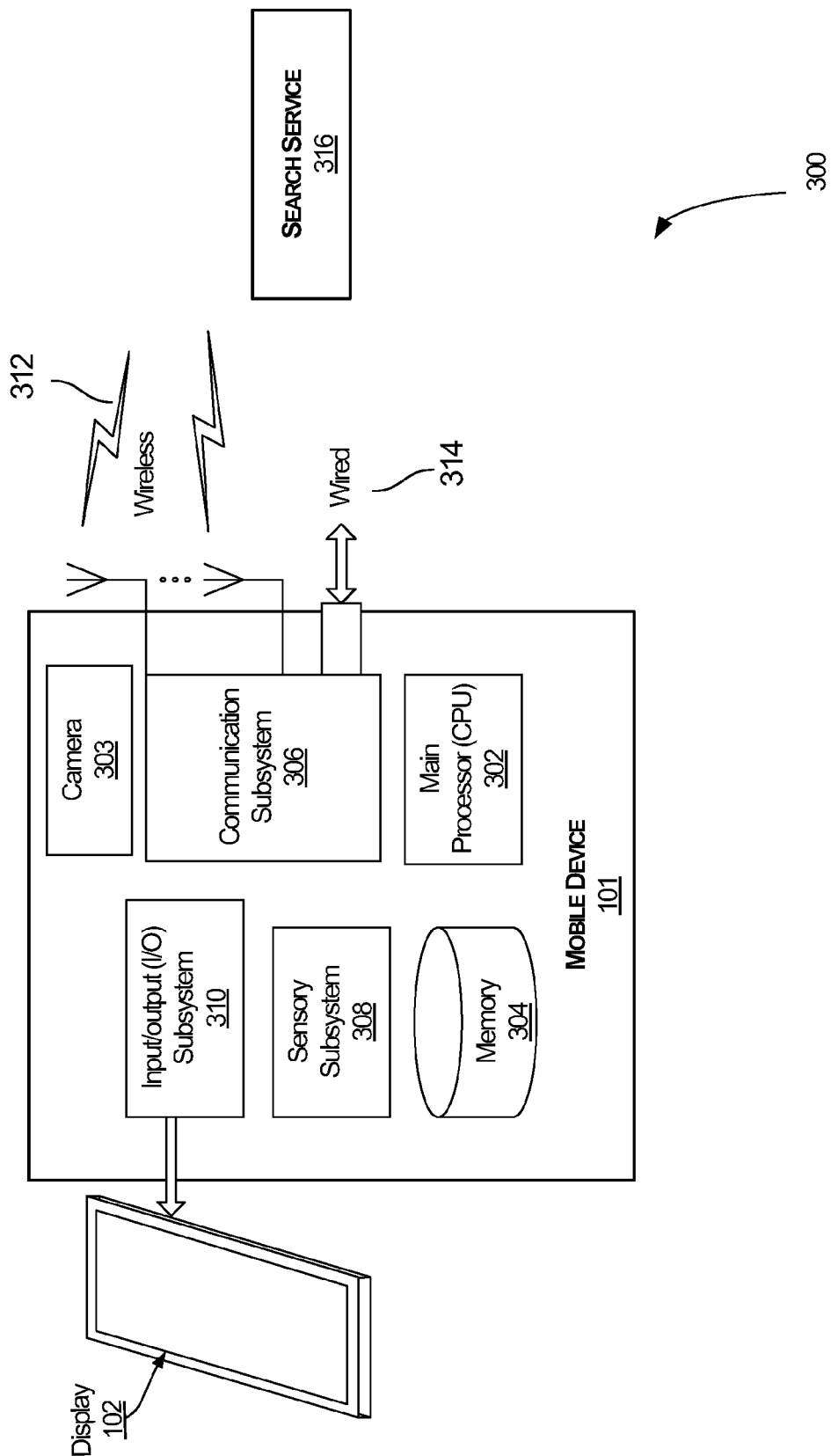
FIG. 3 is a block diagram illustrating a system architecture for image recognition using a computing device, in accordance with an example embodiment of the disclosure.

FIG. 3 is a block diagram illustrating a system architecture for image recognition using a computing device, in accordance with an example embodiment of the disclosure. Referring to FIG. 3, the system architecture 300 may include a handheld (or mobile) device 101 and a search service 316. The handheld device 101 may comprise suitable logic, circuitry, interfaces, and/or code that may be operable to implement various aspects of the user interface for providing feedback for handheld image capture, as described above and in reference to FIGS. 1A-2B. The handheld device 101 may comprise, for example, a main processor (CPU) 302, a camera 303, a system memory 304, a communication subsystem 306, a sensory and input/output (I/O) subsystem 308, an input/output (I/O) subsystem 310, and a display 102.

The main processor 302 may comprise suitable logic, circuitry, interfaces, and/or code that may be operable to process data, and/or control and/or manage operations of the handheld device 101, and/or tasks and/or applications performed therein in connection with the user interface for providing feedback for handheld image capture as well as managing communication of images for image detection (e.g., detection of text, barcodes, logos, artwork, etc) or other processing by the search service 316. In this regard, the main processor 302 may be operable to configure and/or control operations of various components and/or subsystems of the handheld device 101, by utilizing, for example, one or more control signals. The main processor 302 enables running and/or execution of applications, programs and/or code, which may be stored, for example, in the system memory 304. Alternatively, one or more dedicated application processors may be utilized for running and/or executing applications (or programs) in the handheld device 101. For example, the main processor 302 may be operable to analyze images captured by camera 303, using, for example, computer vision algorithms (or other type of text or image detection algorithms), to detect features such as barcodes or other familiar objects within the captured images.

In some instances, one or more of the applications running and/or executing on the handheld device 101 may generate and/or update video content, including one or more user interfaces, which may be rendered via the display 102. In other instances, one or more of the applications running and/or executing on the handheld device 101 may be used to perform functionalities explained herein in reference to a user interface for providing feedback for handheld image capture.

The system memory 304 may comprise suitable logic, circuitry, interfaces, and/or code that may enable permanent and/or non-permanent storage, buffering, and/or fetching of data, code and/or other information, which may be used, consumed, and/or processed. In this regard, the system memory 304 may comprise different memory technologies, including, for example, read-only memory (ROM), random access memory (RAM), Flash memory, solid-state drive (SSD), and/or field-programmable gate array (FPGA). The system memory 704 may store, for example, configuration data, which may comprise parameters and/or code, comprising software and/or firmware.

The communication subsystem 306 may comprise suitable logic, circuitry, interfaces, and/or code operable to communicate data from and/or to the handheld device 101, such as via one or more wired (314) and/or wireless (312) connections. The communication subsystem 306 may be configured to support one or more wired protocols (e.g., Ethernet standards, MOCA, etc.) and/or wireless protocols or interfaces (e.g., Bluetooth, WiFi, cellular, WiMAX, and/or any other available wireless protocol/interface), facilitating transmission and/or reception of signals to and/or from the handheld device 101, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 306 may provide wired and/or wireless connections to external devices and networks.

The sensory subsystem 308 may comprise suitable logic, circuitry, interfaces, and/or code for obtaining and/or generating sensory information, which may relate to the handheld device 101, its user(s), and/or its environment. For example, the sensory and I/O subsystem 308 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 310 may comprise suitable logic, circuitry, interfaces, and/or code for enabling user interactions with the handheld device 101, enabling obtaining input from user(s) and/or to providing output to the user(s). The I/O subsystem 310 may support various types of inputs and/or outputs, including, for example, video, audio, and/or textual.

In this regard, dedicated I/O devices and/or components, external to or integrated within the handheld device 101, may be utilized for inputting and/or outputting data during operations of the I/O subsystem 310. Some I/O devices may comprise displays, mice, keyboards, touchscreens, voice input interfaces, and other input/output interfaces or devices. With respect to video outputs, the I/O subsystem 310 may be operable to generate and/or process video content, graphics, and/or textual data, and/or generate video frames based thereon for display, via the display 102 for example.

The display 102 may comprise suitable logic, circuitry, interfaces and/or code that may enable displaying of video content, which may be handled and/or processed via the I/O subsystem 310. The display 102 may be used in displaying a user interface for providing feedback for handheld image capture.

The search service 316 may comprise suitable circuitry, logic and/or code and may be operable to receive image data from the device 101 via the wireless connection 312 or the wired connection 314 (or a combination thereof). The handheld device 101 may send one or more images captured by the camera 303 to the search service 316, which may perform additional image analysis to detect text, barcodes, logos, artwork, search one or more databases of known images, detect geographic landmarks, and/or perform other image analysis. In instances when the handheld device or the search service does not recognize any text (or any of the above mentioned example image analyses fail) within a given viewing interval, the handheld device may display a failure message to the user upon expiration of the viewing interval.

Referring to FIGS. 1A-3 and in accordance with an example embodiment of the disclosure, a device (e.g., the handheld device 101) may include control circuitry (e.g., CPU 302) containing programming, which may directs the device 101 to capture, during a time interval, a plurality of images (e.g., 104). The control circuitry 302 may be operable to direct the device 101 to determine a sharpness of a first image from the plurality of images based on detection of a difference between a first plurality of high-contrast areas within the first image and a corresponding, second plurality of high-contrast areas within a second image from the plurality of images (e.g., image change detection and image movement detection as explained herein above in reference to FIGS. 1A-2B). The control circuitry 302 may be operable to direct the device 101 to send, to a search service (e.g., 316), the first image. The control circuitry 302 may be operable to direct the device 101 to receive, from the search service 316, one of image recognition data based on the first image or indication of unavailability of the image recognition data.

The control circuitry 302 may be operable to direct the device 101 to detect a movement from at least a portion of the first plurality of high-contrast areas within the first image (e.g., a1 in image 104) to a corresponding portion of the second plurality of high-contrast areas within the second image (e.g., a1' in image 104'). The control circuitry 302 may be operable to direct the device 101 to provide a visual indication of remaining time within the time interval (e.g., user interface 106 as illustrated in FIGS. 1A-1C). The control circuitry 302 may be operable to direct the device 101 to reset the viewing interval and the visual indication, if the movement from the at least a portion of the first plurality of high-contrast areas (a1) within the first image (104) to the corresponding portion of the second plurality of high-contrast areas (a1') within the second image (104') is detected. The control circuitry 302 may be operable to direct the device 101 to reset the viewing interval and the visual indication (106), if also the difference between the first plurality of high-contrast areas within the first image and the corresponding, second plurality of high-contrast areas within the second image from the plurality of images is detected.

The control circuitry 302 may be operable to direct the device 101 to indicate a direction of the movement by at least a portion of the visual indication, if the movement is detected (e.g., large circle 106a lags behind as explained in reference to FIG. 2B). The image recognition data may be received prior to expiration of the time interval. The control circuitry 302 may be operable to direct the device 101 to classify a plurality of pixels in the first plurality of high-contrast areas within the first image into a first plurality of pixel buckets based on brightness. The control circuitry 302 may be operable to direct the device 101 to classify a corresponding plurality of pixels in the second plurality of high-contrast areas within the second image into a second plurality of pixel buckets based on brightness. The detection of the difference between the first plurality of high-contrast areas within the first image and the corresponding, second plurality of high-contrast areas within the second image may be based on a comparison of a number of pixels in the first plurality of pixel buckets and a number of pixels in the second plurality of pixel buckets.

Figure 4:
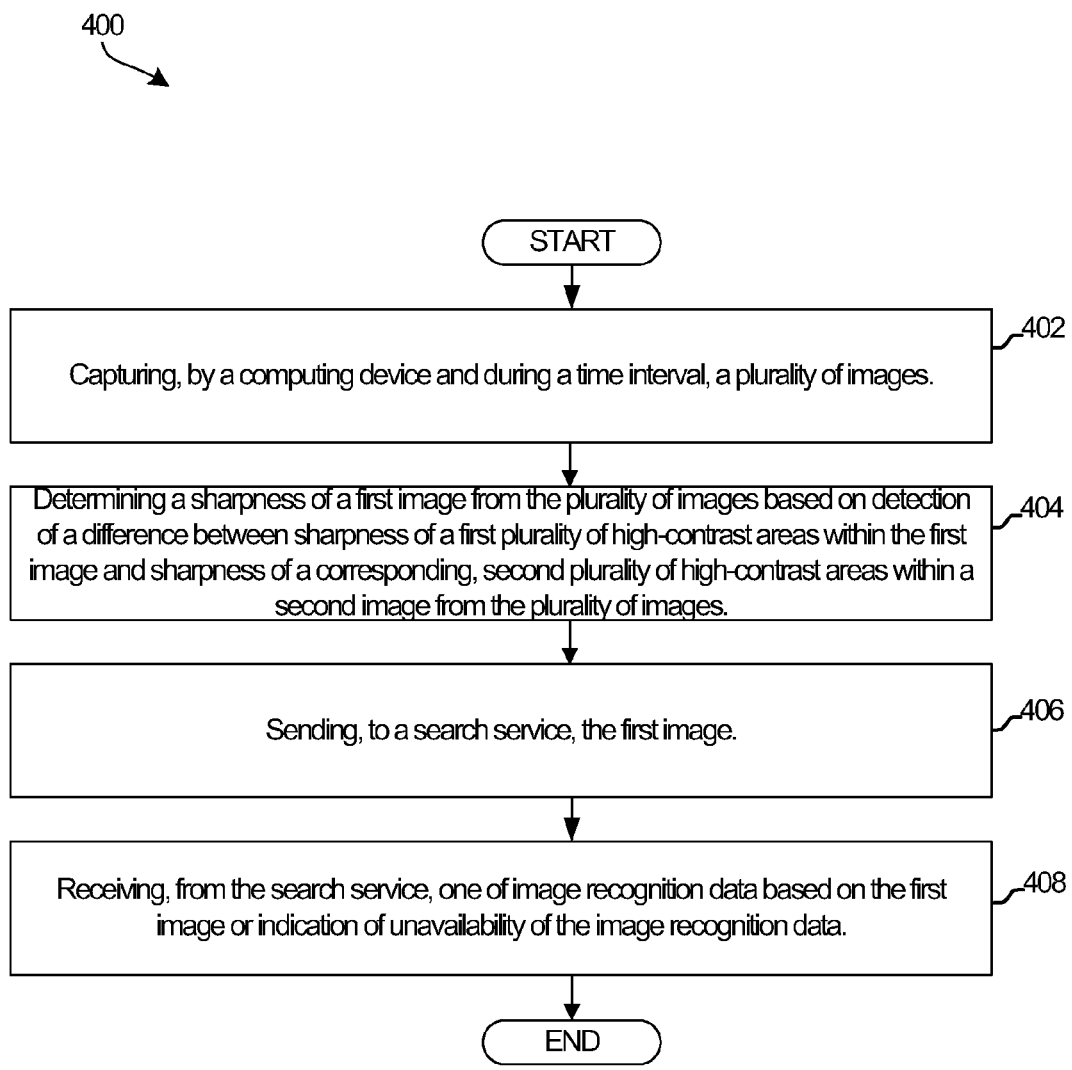
FIG. 4 is a flow chart illustrating example steps of a method, in accordance with an embodiment of the disclosure.

FIG. 4 is a flow chart illustrating example steps of a method, in accordance with an embodiment of the disclosure. Referring to FIG. 4, at 402, a computing device (e.g., device 101) may capture a plurality of images during a time interval. At 404, a sharpness of a first image from the plurality of images may be determined, based on detection of a difference between sharpness of a first plurality of high-contrast areas (e.g., a1-a5) within the first image (e.g., 104) and sharpness of a corresponding, second plurality of high-contrast areas (e.g., a1'-a5') within a second image (e.g., 104') from the plurality of images. At 406, the first image (e.g., 104) may be sent to a search service (e.g., 316). At 408, the handheld device 101 may receive image recognition data based on the first image or indication of unavailability of the image recognition data from the search service 316.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
receiving, by a processor, a plurality of images captured by an image capturing device during a capture period of a predetermined amount of time;
identifying, by the processor, a feature located at a first position in a first image of the plurality of images and a second position in a second image of the plurality of images;
responsive to determining, by the processor, that the second position is more than a threshold distance from the first position, resetting the capture period prior to expiration of the predetermined amount of time;
sending the first image to a search service; and
receiving, from the search service, image recognition data based on the first image.

2. The method according to claim 1, further comprising providing a visual indication of remaining time within the capture period.

3. The method according to claim 2, further comprising, responsive to determining that the second position of the feature is more than the threshold distance from the first position of the feature, indicating, by at least a portion of the visual indication, a direction of movement of the feature, the direction of movement being determined based on the first position and the second position.

4. The method according to claim 1, wherein the image recognition data is received prior to expiration of the predetermined amount of time, and the image recognition data comprises one or more of text, barcode recognition data, logo recognition data, and artwork recognition data.

5. The method according to claim 1, further comprising:
classifying a first plurality of pixels within the first image into a first plurality of pixel buckets based on brightness, wherein the second plurality of pixels is associated with the feature; and
classifying a second plurality of pixels within the second image into a second plurality of pixel buckets based on brightness, wherein the second plurality of pixels is associated with the feature.

6. The method according to claim 5, further comprising:
resetting, by the processor, the capture period in response to detecting a brightness difference between a brightness of the feature within the first image and a brightness of the feature within the second image, the brightness difference being based on a comparison of at least a portion of the first plurality of pixel buckets and at least a portion of the second plurality of pixel buckets.

7. The method according to claim 1, further comprising:
responsive to determining, by the processor, that a difference in sharpness between the first image and the second image exceeds a threshold difference in sharpness, resetting the capture period prior to expiration of the predetermined amount of time.

8. A computing device, comprising:
a processor;
a memory operatively coupled to the processor and storing computer-executable code that, when executed by the processor, causes the computing device to:
receive a plurality of images captured by an image capturing device during a capture period of a predetermined amount of time;
identify a feature located at a first position in a first image of the plurality of images and a second position in a second image of the plurality of images;
responsive to determining that the second position is more than a threshold distance from the first position, reset the capture period prior to expiration of the predetermined amount of time;
send the first image to a search service; and
receive, from the search service, image recognition data based on the first image.

9. The computing device according to claim 8, wherein the memory further stores computer-executable code that, when executed by the processor, causes the computing device to:
provide a visual indication of remaining time within the capture period.

10. The computing device according to claim 9, wherein the memory further stores computer-executable code that, when executed by the processor, causes the computing device to:
responsive to determining that the second position of the feature is more than the threshold distance from the first position of the feature, indicate, by at least a portion of the visual indication, a direction of movement of the feature based on the first position of the feature and the second position of the feature.

11. The computing device according to claim 8, wherein the image recognition data is received prior to expiration of the predetermined amount of time, and wherein the image recognition data comprises one or more of text, barcode recognition data, logo recognition data, and artwork recognition data.

12. The computing device according to claim 8, wherein the memory further stores computer-executable code that, when executed by the processor, causes the computing device to:
classify a first plurality of pixels within the first image into a first plurality of pixel buckets based on brightness, wherein the second plurality of pixels is associated with the feature; and
classify a second plurality of pixels within the second image into a second plurality of pixel buckets based on brightness, wherein the second plurality of pixels is associated with the feature.

13. The computing device according to claim 12, wherein the memory further stores computer-executable code that, when executed by the processor, causes the computing device to:
reset the capture period in response to detecting a brightness difference between a brightness of the feature within the first image and a brightness of the feature within the second image, the brightness difference being determined based on a comparison of at least a portion of the first plurality of pixel buckets and at least a portion of the second plurality of pixel buckets.

14. The computing device according to claim 8, wherein the memory further stores computer-executable code that, when executed by the processor, causes the computing device to:
  responsive to determining that a difference in sharpness between the first image and the second image exceeds a threshold difference in sharpness, reset the capture period prior to expiration of the predetermined amount of time.

15. A non-transitory, computer-readable storage medium, having stored thereon code that, when executed by a processor, cause a computing device to perform a method comprising:
  receiving a plurality of images captured by an image capturing device during a capture period of a predetermined amount of time;
  identify a feature located at a first position in a first image of the plurality of images and a second position in a second image of the plurality of images;
  responsive to determining that the second position is more than a threshold distance from the first position, resetting the capture period prior to expiration of the predetermined amount of time;
  sending the first image to a search service; and
  receiving, from the search service, image recognition data based on the first image.

16. The computer-readable storage medium according to claim 15, wherein the method further comprises providing a visual indication of remaining time within the capture period.

17. The computer-readable storage medium according to claim 15, wherein the method further comprises:
  responsive to determining that a difference in sharpness between the first image and the second image exceeds a threshold difference in sharpness, resetting the capture period prior to expiration of the predetermined amount of time.

* * * * *